(12) United States Patent
Dimitrakos et al.

(10) Patent No.: US 10,505,721 B2
(45) Date of Patent: Dec. 10, 2019

(54) SECURE VIRTUALIZED DATA VOLUMES

(71) Applicant: British Telecommunications Public Limited Company, London (GB)

(72) Inventors: Theo Dimitrakos, London (GB); Ali Sajjad, London (GB)

(73) Assignee: British Telecommunications Public Limited Company, London (GB)

( * ) Notice: Subject to any disclaimer, the term of this patent is extended or adjusted under 35 U.S.C. 154(b) by 186 days.

(21) Appl. No.: 15/507,840

(22) PCT Filed: Sep. 22, 2015

(86) PCT No.: PCT/EP2015/071773
§ 371 (c)(1),
(2) Date: Mar. 1, 2017

(87) PCT Pub. No.: WO2016/046222
PCT Pub. Date: Mar. 31, 2016

(65) Prior Publication Data
US 2017/0288863 A1 Oct. 5, 2017

(30) Foreign Application Priority Data

Sep. 26, 2014 (EP) .................................. 14250107

(51) Int. Cl.
*H04L 9/08* (2006.01)
*H04L 29/06* (2006.01)
*G06F 21/62* (2013.01)

(52) U.S. Cl.
CPC ............. *H04L 9/08* (2013.01); *G06F 21/62* (2013.01); *G06F 21/6209* (2013.01);
(Continued)

(58) Field of Classification Search
CPC ..................... H04L 63/1433; H04L 63/1425
See application file for complete search history.

(56) References Cited

U.S. PATENT DOCUMENTS 8,214,584 B2 * 7/2012 Johnson ............... G06F 3/0605
707/610
8,572,410 B1 * 10/2013 Tkacik .................. H04L 9/0861
380/44

(Continued)

FOREIGN PATENT DOCUMENTS

EP       2645618 A1    10/2013
WO    WO 2013/091221 A1    6/2013
WO    WO 2017/129657 A1    8/2017

OTHER PUBLICATIONS

International Search Report for corresponding International Application No. PCT/EP2015/071773 dated Oct. 26, 2015; 3 pages.

(Continued)

*Primary Examiner* — Ali Shayanfar

(57) ABSTRACT

A method of securing a virtual data volume storing data in a first virtualized computing environment including: deriving a cryptographic key for encrypting the data, the key being derived from first and second parameters; and encrypting the data, wherein the first parameter is generated for association with the virtualized data volume, and the second parameter is generated based on at least one characteristic of a second virtualized computing environment.

9 Claims, 4 Drawing Sheets

(52) U.S. Cl.
CPC ............ *H04L 9/0866* (2013.01); *H04L 29/06* (2013.01); *H04L 63/0428* (2013.01)

(56) References Cited

U.S. PATENT DOCUMENTS

| | | | | |
|---|---|---|---|---|
| 9,141,303 | B2* | 9/2015 | Kishi | G06F 3/0623 |
| 9,189,609 | B1* | 11/2015 | Antony | G06F 9/45558 |
| 2005/0235143 | A1 | 10/2005 | Kelly | |
| 2008/0022385 | A1* | 1/2008 | Crowell | H04L 63/0263 726/11 |
| 2008/0263372 | A1 | 10/2008 | Sako et al. | |
| 2009/0222631 | A1* | 9/2009 | Sugiura | G06F 3/0605 711/161 |
| 2011/0231671 | A1* | 9/2011 | Locker | G06F 21/6209 713/189 |
| 2011/0271073 | A1* | 11/2011 | Ikeda | G06F 11/1402 711/170 |
| 2011/0296197 | A1 | 12/2011 | Konetski et al. | |
| 2012/0036370 | A1 | 2/2012 | Lim et al. | |
| 2012/0117381 | A1* | 5/2012 | Lo | G06F 8/63 713/156 |
| 2012/0297189 | A1* | 11/2012 | Hayton | H04L 9/0822 713/165 |
| 2013/0097421 | A1 | 4/2013 | Lim | |
| 2013/0191648 | A1 | 7/2013 | Bursell | |
| 2013/0243197 | A1 | 9/2013 | Sherwood et al. | |
| 2014/0149666 | A1* | 5/2014 | Nakagawa | G06F 3/0605 711/114 |
| 2014/0208111 | A1* | 7/2014 | Brandwine | H04L 63/0428 713/171 |
| 2014/0282539 | A1 | 9/2014 | Sonnek | |
| 2014/0380035 | A1 | 12/2014 | Marinelli et al. | |
| 2017/0288871 | A1 | 10/2017 | Dimitrakos et al. | |
| 2019/0034218 | A1* | 1/2019 | El-Moussa | G06F 9/4856 |
| 2019/0034645 | A1 | 1/2019 | El-Moussa et al. | |
| 2019/0050247 | A1 | 2/2019 | El-Moussa et al. | |

OTHER PUBLICATIONS

Written Opinion of the International Searching Authority for corresponding International Application No. PCT/EP2015/071773 dated Oct. 26, 2015; 5 pages.
Application and Filing Receipt for U.S. Appl. No. 15/509,090, filed Mar. 6, 2017, Inventor(s): Dimitrakos et al.
Application and Filing Receipt for U.S. Appl. No. 16/073,363, filed Jul. 27, 2018, Inventor(s): El-Moussa et al.
Application and Filing Receipt for U.S. Appl. No. 16/073,396, filed Jul. 27, 2018, Inventor(s): El-Moussa et al.
Application and Filing Receipt for U.S. Appl. No. 16/073,424, filed Jul. 27, 2018, Inventor(s): El-Moussa et al.
Application as filed for U.S. Appl. No. 16/073,453, filed Jul. 27, 2018, Inventor(s): El-Moussa et al.
Zhang et al: "CloudVisor: Retrofitting Protection of Virtual Machines in Multi-tenant Cloud with Nested Virtualization"; Oct. 23, 2011 (Oct. 23, 2011). pp. 203-216. XP058005755. DOI: 10.1145/2043556. 2043576 ISBN: 978-1-4503-0977-6; 14 pages.
Muller, et al.: TreVisor "OS-Independent Software-Based Full Disk Encryption Secure against Main Memory Attacks" Department of Computer Science Friedrich-Alexander University of Erlangen-Nuremberg F. Bao, P. Samarati, and J. Zhou (Eds.): ACNS 2012, LNCS 7341, pp. 66-83, 2012. Springer-Verlag Berlin Heidelberg 2012; Jun. 26, 2012 (Jun. 26, 2012). pp. 66-83. XP055284332. ISBN: 978-3-642-31284-7; https://mirror.robert-marquardt. comjdownloadsjtrevisor.pdf; 18 pages.
International Search Report and Written Opinion for PCT Application No. PCT/EP2017/051339 dated Mar. 31, 2017; 10 pages.
VMWare vSphere Storage; Update 1; Modified Jul. 12, 2018; VMware vSphere 6.0 VMware ESXi 6.0 vCenter Server 6.0; VMware, Inc. 3401 Hillview Ave. Palo Alto, CA 94304 Copyright © 2009-2018; https://docs.vmware.com/; 315 pages.
Popek et al., "Formal Requirement for Virtualizable Third Generation Architectures"; University of California, Los Angeles; Communications of the AMC; Jul. 1974, vol. 17, No. 7; 10 pages.
Hunt et al; "Detours: Binary Interception of Win32 Functions"; Microsoft Research One Microsoft Way Redmond, WA 98052; Published in Proceedings of the 3rd USENIX Windows NT Symposium. Seattle, WA, Jul. 1999; http://research.microsoft.com/sn/detours; 9 pages.
Bremer; Intercepting System Calls on x86_64 Windows; May 15, 2012; Intercepting System Calls on x86_64 Windows | Development & Security; [retrieved Jul. 26, 2018]; http://jbremer.org/intercepting-system-calls-on-x86_64-windows/ 9 pages.
Seung-Woo Kim (Intel); Intercepting System API Calls | Intel® Software (https://software.intel.com/en-us/user/336519), published on Mar. 7, 2012; 13 pages.
Myers et al., University of Maryland; Intercepting Arbitrary Functions on Windows, UNIX, and Macintosh OS X Platforms CS-TR-4585, UMIACS-TR-2004-28; Center for Bioinformatics and Computational Biology Institute for Advanced Computer Studies, University of Maryland, MD 20742 USA CS-TR-4585, UMIACS-TR-2004-28.
International Search Report and Written Opinion for PCT Application No. PCT/EP2017/051614 dated Mar. 31, 2017; 8 pages.
Bragg, Robert; The Encrypting File System, "How EFS Works" [retrieved on Jul. 26, 2018]; https://technet.microsoft.com/en-us/library/cc700811.aspx#mainSection 14 pages.
International Search Report and Written Opinion for PCT Application No. PCT/EP2017/051613 dated Apr. 20, 2017; 10 pages.
International Search Report and Written Opinion for PCT Application No. PCT/EP2017/051610 dated Mar. 31, 2017; 8 pages.

* cited by examiner

SECURE VIRTUALIZED DATA VOLUMES

CROSS-REFERENCE TO RELATED APPLICATIONS

The present application is a National Phase entry of PCT Application No. PCT/EP2015/071773, filed on 22 Sep. 2015, which claims priority to EP Patent Application No. 14250107.1, filed on 26 Sep. 2014, which are hereby fully incorporated herein by reference.

TECHNICAL FIELD

The present disclosure relates to secure virtualized data volumes. In particular, it relates to a security system for encrypting virtualized data volumes based on multi-part keys.

BACKGROUND

Data volume encryption is known for storage devices, such as all-disk encryption techniques including Microsoft's BitLocker®. Such techniques can encrypt a data volume, such as a data storage device or a partition of a data storage device, based on a secure cryptographic key. For increased integrity, the key can be secured in a physical manner, such as by storing the key on a portable media device such as a universal serial bus (USB) key, or by reliance on a trusted hardware component such as a Trusted Platform Module (TPM), implemented at least partly in hardware or firmware such as by way of a dedicated chip or part of a chip. Thus in such arrangements the integrity of data volume encryption is dependent on the integrity of the key and its storage.

Computing environments are increasingly virtualized such that computing systems, operating systems and associated resources including hardware, networking, software and associated services are provided in a virtual manner. For example, systems can be deployed including operating systems, storage devices, virtual devices and drivers, applications and the like for execution in virtual machine environments. Typically, such virtualized systems are packaged including one or more memory or storage images of installed system software, such as an operating system, kernel and the like, along with a specification or image of other required resources such as virtualized data volumes. A virtualized data volume is a virtual storage device mapped to one or more other virtual and/or physical storage devices such that, ultimately, data is stored in a physical manner that may be abstracted from a user or virtualized system but that is presented to the user or system by way of an interface to appear as a physical storage volume such as a disk. Such virtualized environments can operate with virtual machine environments such as hypervisors including the VMWare suite of hypervisor software.

Various challenges exist when seeking to extend encryption techniques for data volumes to virtualized data volumes. Firstly, the very nature of a virtualized data volume is such that the volume may be instantiated any number of times within virtual machines in virtualized computing environments. Since the precise nature of the virtualized environment is abstracted from the virtualized data volume, the hardware basis for the virtualized environment is unknown (and is largely emulated, simulated or otherwise virtualized by, for example, a hypervisor or the like). Accordingly hardware based encryption mechanisms cannot be employed since hardware is virtualized and the real hardware used to execute a virtual environment may be shared by many virtualized environments, and virtual machines may transition between hardware platforms. Secondly, encrypted data volumes using a cryptographic key are susceptible to brute force attack or disclosure of the key at a runtime of the environment. For example, the BitLocker® approach to all-disk encryption has been shown to be susceptible to a "cold boot attack" in which decryption keys originating with, or based on, a hardware TPM are accessible from dynamic random-access memory modules (DRAMs) in a computer system even after power is removed from the system. Thus it is possible to access an encrypted data volume using such discovered keys.

It would therefore be advantageous to provide data volume encryption for virtualized data volumes while overcoming these disadvantages with known secure data storage techniques.

SUMMARY

The present disclosure accordingly provides, in a first aspect, a method of securing a virtual data volume storing data in a first virtualized computing environment comprising: deriving a cryptographic key for encrypting the data, the key being derived from first and second parameters; and encrypting the data, wherein the first parameter is generated for association with the virtualized data volume, and the second parameter is generated based on at least one characteristic of a second virtualized computing environment.

Thus in this way the virtual data volume is secured by encryption using a key derived based on multiple parameters (a "multi-part key") where one of the parameters is associated with the virtualized data volume and the other parameter is based on a target virtualized computing environment with which the virtual machine will execute. The multi-part key approach introduces considerable challenge to parties seeking to undermine the security of an encrypted data volume since both parameters along with the key derivation function employed by a key derivation system are required to arrive at the required cryptographic key. The first parameter is generated specifically for the virtualized data volume and is therefore applicable only to the particular data volume. Even if the first parameter is compromised, such as by brute-force attack or compromising the virtual machine package, access to the encrypted virtualized data volume is not possible without the second parameter that can only be determined based on a target virtualized computing environment that cannot, itself, be inferred or determined from the virtual machine package. Accordingly, the second parameter can only be determined when the virtual machine is deployed, or is to be deployed, to the target virtualized computing environment since information about the target virtualized computing environment is required to generate the second parameter for deriving the cryptographic key. Advantageously, embodiments of the present disclosure allow the encryption and decryption of the virtualized data volume using a symmetric key which provides considerably better cryptographic performance than asymmetric keys which tend to be slower. This is especially pertinent when encrypting all data in the virtualized data volume which can be relatively large in size.

In one embodiment the first parameter is a pseudo-random number generated by a virtual machine for which the virtual data volume is instantiated.

In one embodiment the virtual machine and the encrypted virtual data volume are packaged into a portable virtual machine package for transfer to the second virtualized computing environment.

In one embodiment the at least one characteristic is a characteristic common to the first virtualized computing environment and the second virtualized computing environment.

In one embodiment the at least one characteristic is a characteristic of a hypervisor of the second virtualized computing environment.

In one embodiment the at least one characteristic is a processor identifier for the second virtualized computing environment.

In one embodiment the at least one characteristic is a hash value associated with the second virtualized computing environment.

In one embodiment the portable virtual machine package is encrypted for the transfer.

The present disclosure accordingly provides, in a second aspect, a data volume security system to secure a virtual data volume storing data in a first virtualized computing environment comprising: a key derivation system to derive a cryptographic key for encrypting the data, the key being derived from first and second parameters, wherein the first parameter is generated for association with the virtualized data volume, and the second parameter is generated based on at least one characteristic of a second virtualized computing environment.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment will now be described, by way of example only, with reference to the accompanying drawings, in which.

DETAILED DESCRIPTION

Figure 1:
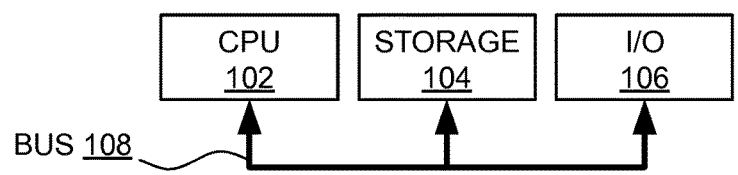
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
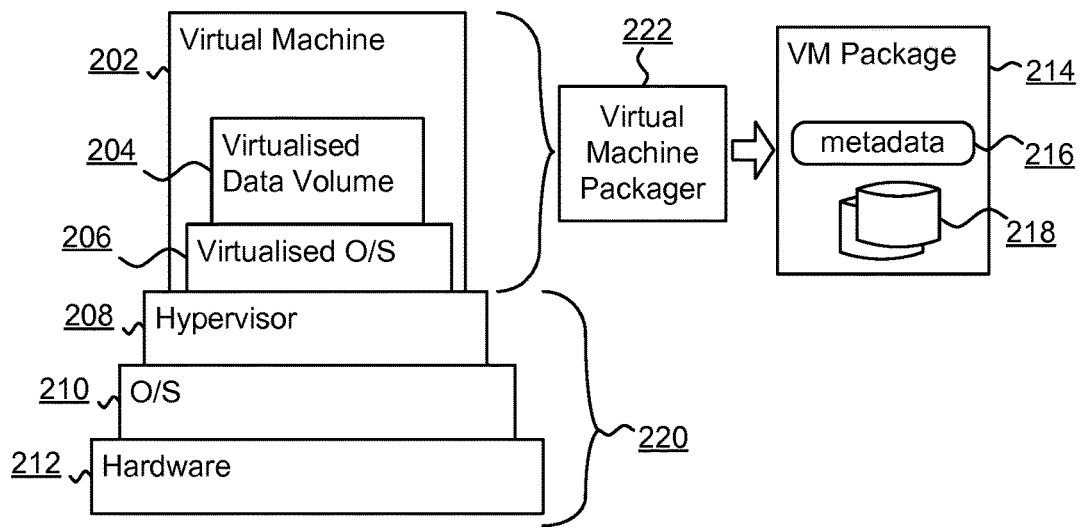
FIG. 2 is a component diagram of a computer system including a virtualized computing environment suitable for use with embodiments of the present disclosure.

FIG. 2 is a component diagram of a computer system including a virtualized computing environment 220 suitable for use with embodiments of the present disclosure. The virtualized computing environment 220 includes a hypervisor 208 executing with a native operating system 210 on a hardware platform 212 as will be familiar to those skilled in the art. In some arrangements, the native operating system can be omitted with the hypervisor 208 executing directly with the hardware 212 (known as type 1, native or bare metal hypervisors). The hypervisor 208 provides an environment in which one or more virtual machines (VMs) 202 can be deployed for execution. Each virtual machine 202 includes a virtualized operating system 206 executing in conjunction with a virtualized, emulated, simulated or abstracted interface of the hypervisor such that software, drivers and services executing in the virtual machine 202 can be nescient with respect to the precise nature of the hardware platform on which the virtual machine is operating.

The virtual machine includes a virtualized data volume 204 as a virtual storage device instantiated for use in storing data for the virtual machine 202, such as a virtual disk, drive or storage. The virtualized data volume 204 ultimately corresponds to one or more data storage devices provided by the virtualized computing environment 220, though the precise nature of the hardware and software services embodying the virtualized storage device can be unknown to software executing within the virtual machine 202. For example, the virtualized data volume 204 can be provided as a memory area of the native operating system 210 or hardware 212 of the virtualized computing environment 220. Alternatively, the virtualized data volume 204 can be an abstraction of one or more physical storage devices such as physical memory, disk storage and the like. From the perspective of software and services executing within the virtual machine 202 the virtualized data storage volume can appear as a system attached storage volume such as a disk drive or the like.

One capability of virtualized computing environments is an ability to package and transfer a virtual machine 202, such as for deployment to a different virtualized computing environment. For example, a virtual machine can be packaged for deployment to a cloud computing environment provided by a cloud service provider, or for transfer between cloud computing environments. Accordingly, a virtual machine packager 222 is a software, hardware, firmware or combination component arranged to package a virtual machine as a virtual machine package 214. The virtual machine package 214 is a compound package of the virtual machine 202 that is suitable for transfer between virtual machines or for storage for subsequent re-deployment to the, or a different, virtualized computing environment. In this sense the virtual machine package 214 is a portable package in the sense that it is transferable between virtualized computing environments. In one embodiment the virtual machine package 214 is an Open Virtualization Format (OVK) package such as can be generated by a virtual machine packager 222 such as a hypervisor or virtual machine manager. For example, virtualized computing environments provided by VMWare, Citrix, Oracle, IBM and Microsoft are capable of producing, exporting or generating a virtual machine package 214 from a state of a virtual machine in a virtualized computing environment 220. In some contexts such virtual machine packages 214 can be referred to as virtual machine images or templates.

The virtual machine package 214 includes data 218 and metadata 216. The data 218 can include one or more data images of a virtual machine state at the moment of generation of the virtual machine package 214. For example, data 218 can include a memory image of software executing in the virtual machine including operating system software instructions, operating system data stores, memory segments, pages, heaps, stacks, virtual processor states, application states, application data stores, states and memory associated with libraries, applications and services and the like. Further, data 218 includes a representation or image of the virtualized data volume 204 such as a memory dump of an address range corresponding to the virtualized data volume 204. The metadata 216 includes definitions, parameters and attributes for the virtual machine 202 for deployment of the virtual machine 202 to a virtualized computing environment.

Figure 3:
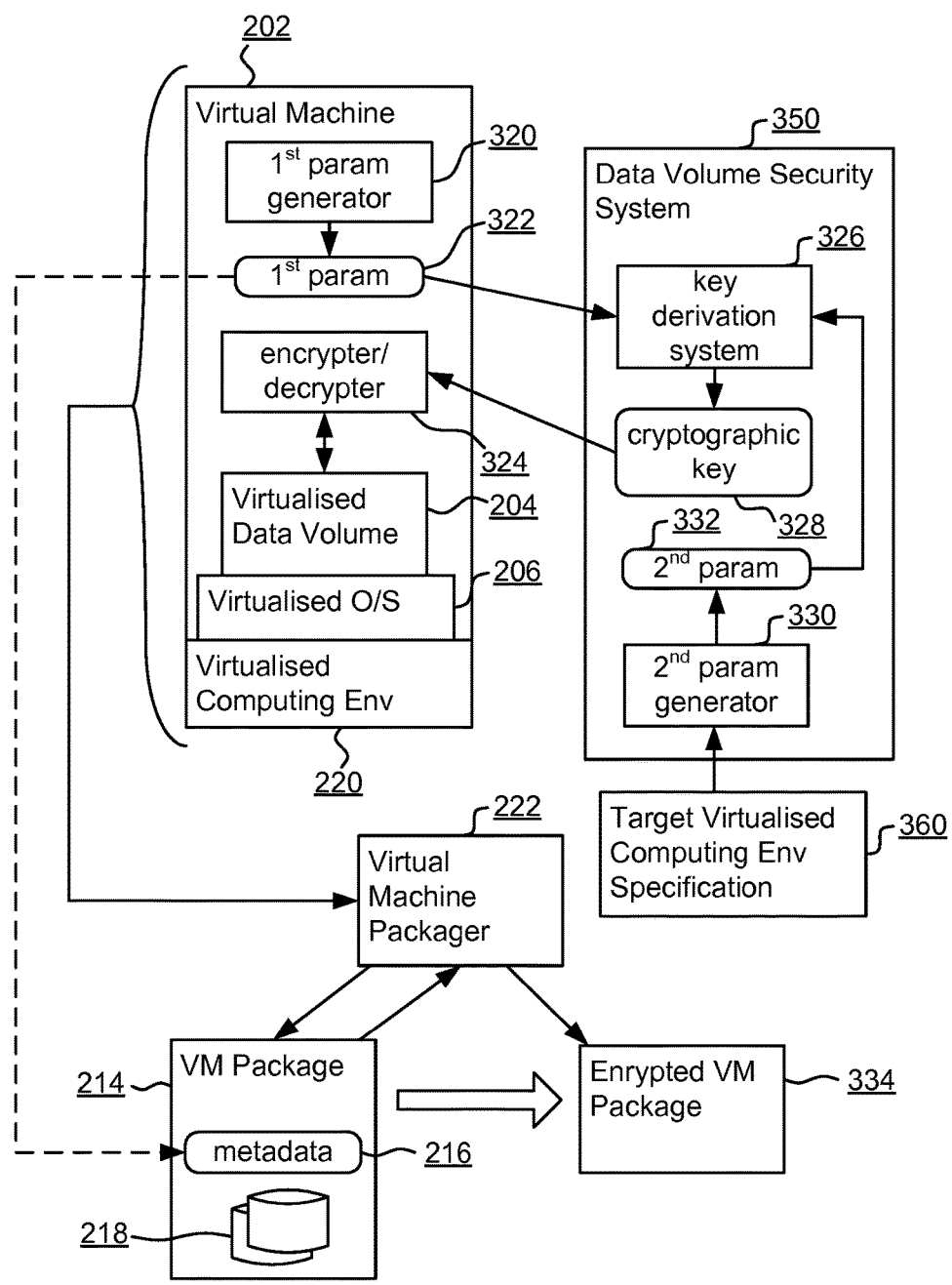
FIG. 3 is a component diagram of an arrangement for packaging a virtual machine and an encrypted virtual data volume into a virtual machine package in accordance with embodiments of the present disclosure.

FIG. 3 is a component diagram of an arrangement for packaging a virtual machine 202 and an encrypted virtual data volume 204 into a virtual machine package 214 in accordance with embodiments of the present disclosure. The arrangement of FIG. 3 includes a data volume security system 350 as a software, hardware, firmware or combination component arranged to provide security services to a virtual machine 202 deployed to a virtualized computing environment 220. The data volume security system includes a key derivation system 326 such as a key derivation function of a software component or a hardware or firmware key derivation system for generating a symmetric cryptographic key 328 for use in the encryption and decryption of data. The key derivation system derives the key 328 based on first 322 and second 332 parameters as will be described below. The key 328 is provided to an encrypter/decrypter 324 software component in the virtual machine 202 for encrypting data stored in a data volume 204 of the virtual machine 202. The encrypter/decrypter 324 is operable using a symmetric cryptographic key and a cryptographic algorithm as are well known in the art.

The data volume security system 350 can be provided as a service external to the virtual machine 202 and the virtualized computing environment 220. For example, the data volume security system 350 can be provided using a client/server paradigm such that the system 350 is provided at a server for communication with a client (not depicted) executing in or with the virtual machine 202. In one embodiment, the system 350 is provided as part of, alongside or with the virtualized computing environment 220. Alternatively, the data volume security system 350 can be provided in part or substantially entirely within the virtual machine 202.

The first parameter 322 is generated by a first parameter generator 320 of the virtual machine 202. The first parameter generator 320 is a software component adapted to generate the first parameter 322 for association with the virtualized data volume 204. For example, the first parameter 322 is a pseudo-random or random numeric value generated by the virtual machine 320.

The second parameter 332 is generated by a second parameter generator 330 as a software, hardware or firmware component adapted to generate the second parameter 332 based on at least one characteristic of a target 360 virtualized computing environment specification. The target virtualized computing environment specification 360 is a description, configuration, definition or arrangement of a target virtualized computing environment 420 (see FIG. 4) for deployment of the virtual machine 202. In one embodiment, the target virtualized computing environment 420 is configured substantially the same as the virtualized computing environment 220 from which the virtual machine 202 is packaged. For example, the second parameter generator 330 generates the second parameter 332 based on one or more characteristics of a hypervisor or other aspects of a target virtualized computing environment 420 with which the virtual machine is intended to execute and as defined by the target virtualized computing environment specification 360 such as: one or more processor or virtual processor identifiers of a hypervisor of the target virtualized computing environment 420; a serial number, identifier, hash or secret value generated or stored by the hypervisor; a configuration setting, arrangement, configuration option, version information, manufacturer, vendor or distributor information, date or timestamp, build identifier, size, hash code, checksum or other attribute or characteristic associated with the hypervisor. In one embodiment, the virtual machine package 214 is packaged for transfer to the target virtualized computing environment 420 (as will be described in detail below). In one embodiment the at least one characteristic used by the second parameter generator 330 to generate the second parameter 332 is a characteristic common to both the virtualized computing environment 220 from which the virtual machine is packaged and a target virtualized computing environment 420. Further, in one embodiment, the second parameter is determined based on a characteristic of the target virtualized computing environment 420 in execution, such as an executing hypervisor, such that the characteristic cannot be determined from a configuration for the target virtualized computing environment 420 prior to execution, such as a configuration or metadata for deployment of a virtual machine stored in a virtual machine package 214.

Thus, in use, the key derivation system 326 receives the first parameter 322 associated with the virtualized data volume 204 from the virtual machine 202 and the second parameter 332 based on a target virtualized computing environment 420. Subsequently the key derivation system 326 generates the key 328 based on the two parameters. The key is provided to the encrypter/decrypter 324 for encrypting and decrypting data in the virtualized data volume 204 so as to secure the virtualized data volume 204.

The virtual machine 202 and the encrypted virtual data volume 204 are subsequently packaged by the virtual machine packager 222. In one embodiment the first parameter 322 is included in the virtual machine package 214 by virtue of its inclusion in the virtual machine 202. Alternatively, the first parameter 322 can be explicitly incorporated in the virtual machine package 214 as part of metadata 216 of the virtual machine package 214. In one embodiment the virtual machine packager 222 encrypts the virtual machine package 214 as an encrypted virtual machine package 334 so as to further secure the virtual machine 202 and/or the first parameter 322. Such encryption of the virtual machine package 214 can be based on a symmetric key or asymmetric keys which can be managed by the virtual machine packager 222, the virtualized computing environment 220, the data volume security system 350 or some external or additional component trusted for such purpose.

Thus in this way the virtualized data volume 204 is secured by encryption using a key derived based on multiple parameters (a "multi-part key") where one of the parameters is associated with the virtualized data volume 204 in the virtual machine 202 and the other parameter is based on a target virtualized computing environment 420 with which the virtual machine 202 will execute. The multi-part key approach introduces considerable challenge to parties seeking to undermine the security of an encrypted data volume since both parameters along with the key derivation function employed by the key derivation system 326 are required to arrive at the required cryptographic key. The first parameter is generated specifically for the virtualized data volume 204 and is therefore applicable only to the particular data volume 204. Even if the first parameter is compromised, such as by brute-force attack or compromising the virtual machine package 214, access to the encrypted virtualized data volume 204 is not possible without the second parameter that can only be determined based on a target virtualized computing environment 420 that cannot, itself, be inferred or determined from the virtual machine package 214. Accordingly, the second parameter can only be determined when the virtual machine 202 is deployed, or is to be deployed, to the target virtualized computing environment 420 since information about the target virtualized computing environment 420 is required to generate the second parameter for deriving the cryptographic key. Advantageously, embodiments of the present disclosure allow the encryption and decryption of the virtualized data volume 204 using a symmetric key which provides considerably better cryptographic performance than asymmetric keys which tend to be slower. This is especially pertinent when encrypting all data in the virtualized data volume which can be relatively large in size.

Figure 4:
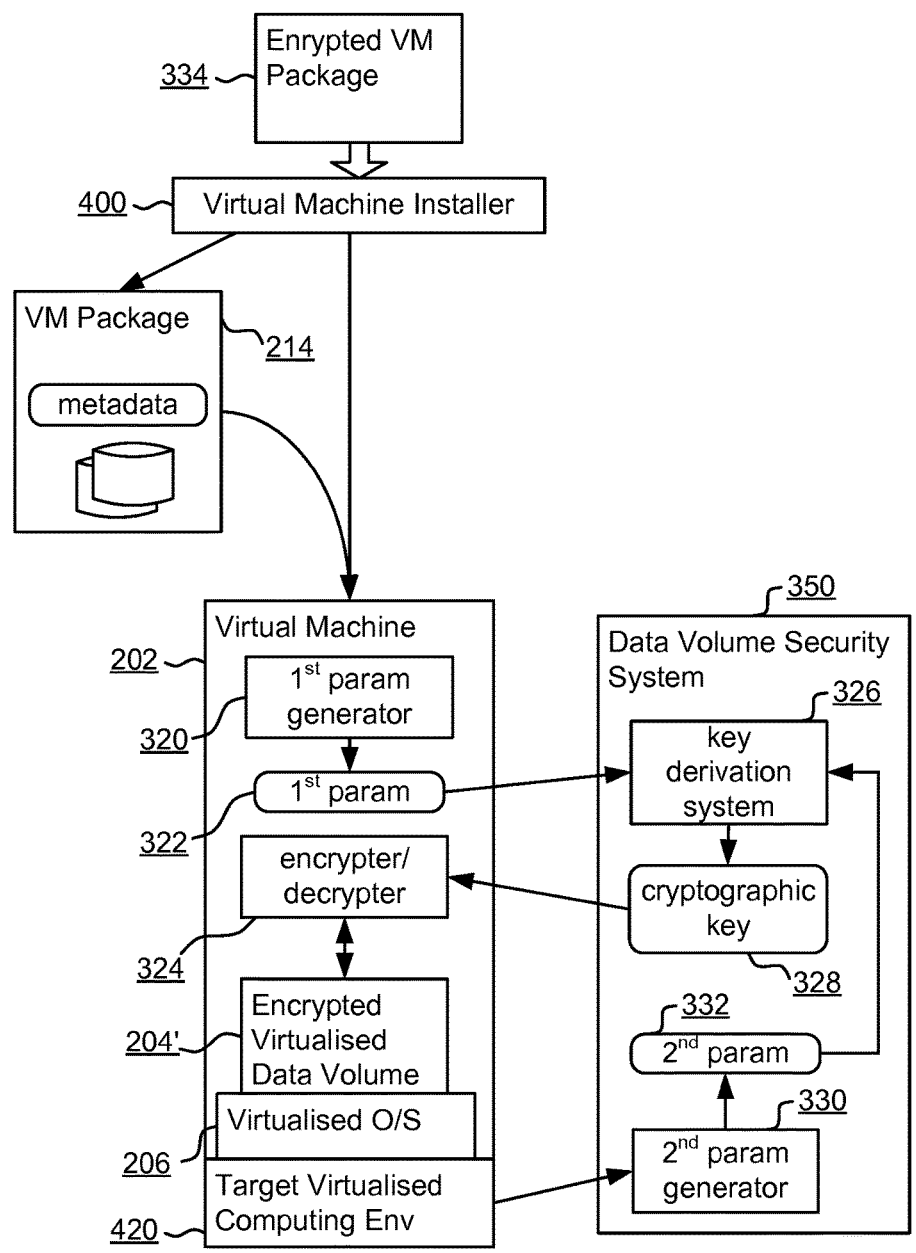
FIG. 4 is a component diagram of an arrangement for deploying a virtual machine package including an encrypted virtual data volume in a target virtualized computing environment in accordance with embodiments of the present disclosure.

FIG. 4 is a component diagram of an arrangement for deploying a virtual machine package 214 including an encrypted virtual data volume 204 in a target virtualized computing environment 420 in accordance with embodiments of the present disclosure. A virtual machine installer 400 is a software, hardware, firmware or combination component for installing, deploying, instantiating or otherwise executing a virtual machine in a target virtualized computing environment 420. The target virtualized computing environment 420 is a virtualized computing environment configured in accordance with a specification, configuration or other metadata associated with the virtual machine package 214 such as metadata 216. In some embodiments the target virtual machine environment 420 can include a cloud computing environment and the configuration or specification of the target virtual machine environment 420 includes characteristics of the environment 420 such as certain software, hardware, facilities, services and resources to be provided by the environment 420. For example, the virtual machine installer 400 is a function of a virtualized computing environment such as a VMware environment, Citrix environment or the like.

In embodiments where the virtual machine package 214 is encrypted as encrypted virtual machine package 334, the virtual machine installer 400 undertakes, triggers or arranges for the decryption of the encrypted virtual machine package 334. Subsequently the virtual machine installer deploys the virtual machine 202 to the target virtualized computing environment 420 based on the virtual machine package. Once deployed, the virtual machine 202 includes components substantially as hereinbefore described. Specifically, the virtual machine 202 includes an encrypted virtualized data volume 204' that was encrypted before packaging of the virtual machine 202 according to the arrangement of FIG. 3.

The encrypter/decrypter component 324 is adapted to decrypt the encrypted virtualized data volume 204' in order that data stored in the encrypted virtualized data volume 204' can be accessible in, with or to the virtual machine 202. The decryption by the encrypter/decrypter 324 can be undertaken for all data in the encrypted virtualized data volume 204' on or after deployment of the virtual machine 202. Alternatively, decryption and encryption can take place on an ongoing basis as data is retrieved from and/or stored in the encrypted virtualized data volume 204' by software, applications or services executing in the virtual machine 202.

The encrypter/decrypter component 324 decrypts data stored in the encrypted virtualized data volume 204' using a cryptographic key provided by the data volume security system 350. As previously described, the cryptographic key 328 is generated based on the first 322 and second 332 parameters, except that on deployment of the virtual machine 202 in accordance with the arrangement of FIG. 4 the second parameter 332 is generated by the second parameter generator 330 based on the target virtualized computing environment 420. Thus the second parameter 332 is suitable for deriving, by the key derivation system 326, a cryptographic key 328 for decrypting data stored in the encrypted virtualized data volume 204'. In this way the virtual machine 202 can be deployed and data stored in the encrypted virtualized data volume 204' can be accessed only when the virtual machine 202 is deployed to the target virtualized computing environment 420.

Figure 5:
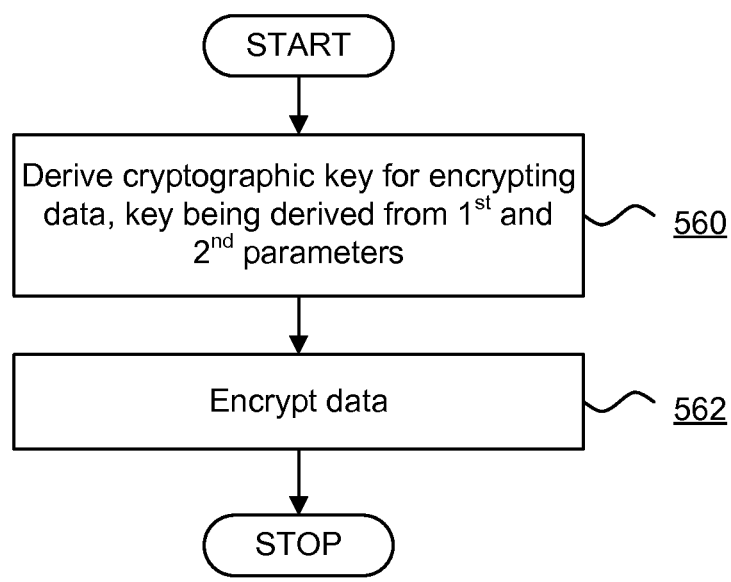
FIG. 5 is a flowchart of a method of securing a virtual data volume storing data in a virtualized computing environment in accordance with embodiments of the present disclosure.

FIG. 5 is a flowchart of a method of securing a virtual data volume 204 storing data in a virtualized computing environment 220 in accordance with embodiments of the present disclosure. Initially at 560 the data volume security system 350 derives the symmetric cryptographic key 328 based on the first 322 and second 332 parameters as hereinbefore described. Subsequently, at 562, data stored in the virtual data volume 204 is encrypted using the symmetric cryptographic key.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of securing a virtual data volume storing data in a first virtualized computing environment comprising:
   deriving a cryptographic key for encrypting the data, the key being derived from first and second parameters, the first parameter being a pseudo random number generated by a virtual machine for which the virtual data volume is instantiated; and
   encrypting the data,
   wherein the first parameter is generated for association with the virtual data volume, the virtual data volume corresponding to at least one data storage device provided by the first virtualized computing environment, and the second parameter is generated based on at least one characteristic of a second virtualized computing environment, wherein the first virtualized computing environment is different from the second virtualized computing environment, and wherein the virtual machine and the encrypted virtual data volume are packaged into a portable virtual machine package for transfer to the second virtualized computing environment.

2. The method of claim 1 wherein the at least one characteristic is a characteristic common to the first virtualized computing environment and the second virtualized computing environment.

3. The method of claim 2 wherein the at least one characteristic is a characteristic of a hypervisor of the second virtualized computing environment.

4. The method of claim 1 wherein the at least one characteristic is a processor identifier for the second virtualized computing environment.

5. The method of claim 1 wherein the at least one characteristic is a hash value associated with the second virtualized computing environment.

6. The method of claim 1 wherein the portable virtual machine package is encrypted for the transfer.

7. A data volume security system to secure a virtual data volume storing data in a first virtualized computing environment, the system comprising:
   at least one processor and memory configured to derive a cryptographic key for encrypting the data, the cryptographic key being derived from first and second parameters, the first parameter being a pseudo-random number generated by a virtual machine for which the virtual data volume is instantiated,
   wherein the first parameter is generated for association with the virtual data volume, the virtual data volume corresponding to at least one data storage device provided by the first virtualized computing environment, and the second parameter is generated based on at least one characteristic of a second virtualized computing environment, wherein the first virtualized computing environment is different from the second virtualized computing environment, and wherein the virtual machine and the encrypted virtual data volume are packaged into a portable virtual machine package for transfer to the second virtualized computing environment.

8. The system of claim 7 wherein the at least one characteristic is a characteristic common to the first virtualized computing environment and the second virtualized computing environment.

9. A non-transitory computer-readable storage medium comprising computer-executable code which, when executed on a computer, causes the computer to:
   derive a cryptographic key for encrypting the data, the key being derived from first and second parameters, the first parameter being a pseudo random number generated by a virtual machine for which the virtual data volume is instantiated; and
   encrypt the data,
   wherein the first parameter is generated for association with the virtual data volume, the virtual data volume corresponding to at least one data storage device provided by the first virtualized computing environment, and the second parameter is generated based on at least one characteristic of a second virtualized computing environment, wherein the first virtualized computing environment is different from the second virtualized computing environment, and wherein the virtual machine and the encrypted virtual data volume are packaged into a portable virtual machine package for transfer to the second virtualized computing environment.

* * * * *